March 17, 1936.  F. M. STOUT ET AL  2,034,216
FLUID PRESSURE CONTROL VALVE
Filed Aug. 20, 1934  3 Sheets-Sheet 2

Inventors
Frank M. Stout,
W. P. Cunningham,
By Clarence A. O'Brien
Attorney

March 17, 1936.　　F. M. STOUT ET AL　　2,034,216
FLUID PRESSURE CONTROL VALVE
Filed Aug. 20, 1934　　3 Sheets-Sheet 3

Inventors
Frank M. Stout,
W. P. Cunningham,
By *Clarence A. O'Brien*
Attorney

Patented Mar. 17, 1936

2,034,216

UNITED STATES PATENT OFFICE 2,034,216

FLUID PRESSURE CONTROL VALVE

Frank M. Stout and Wintford P. Cunningham, Tulsa, Okla.

Application August 20, 1934, Serial No. 741,934

2 Claims. (Cl. 251—101)

This invention relates to a valve for controlling the flow of fluid under pressure, the general object of the invention being to provide means whereby the pressure of fluid will move the valve off its seat, when manually operated means are actuated, so that the valve can be turned to closed position with the minimum amount of effort and without wear upon the valve or seat.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 3:
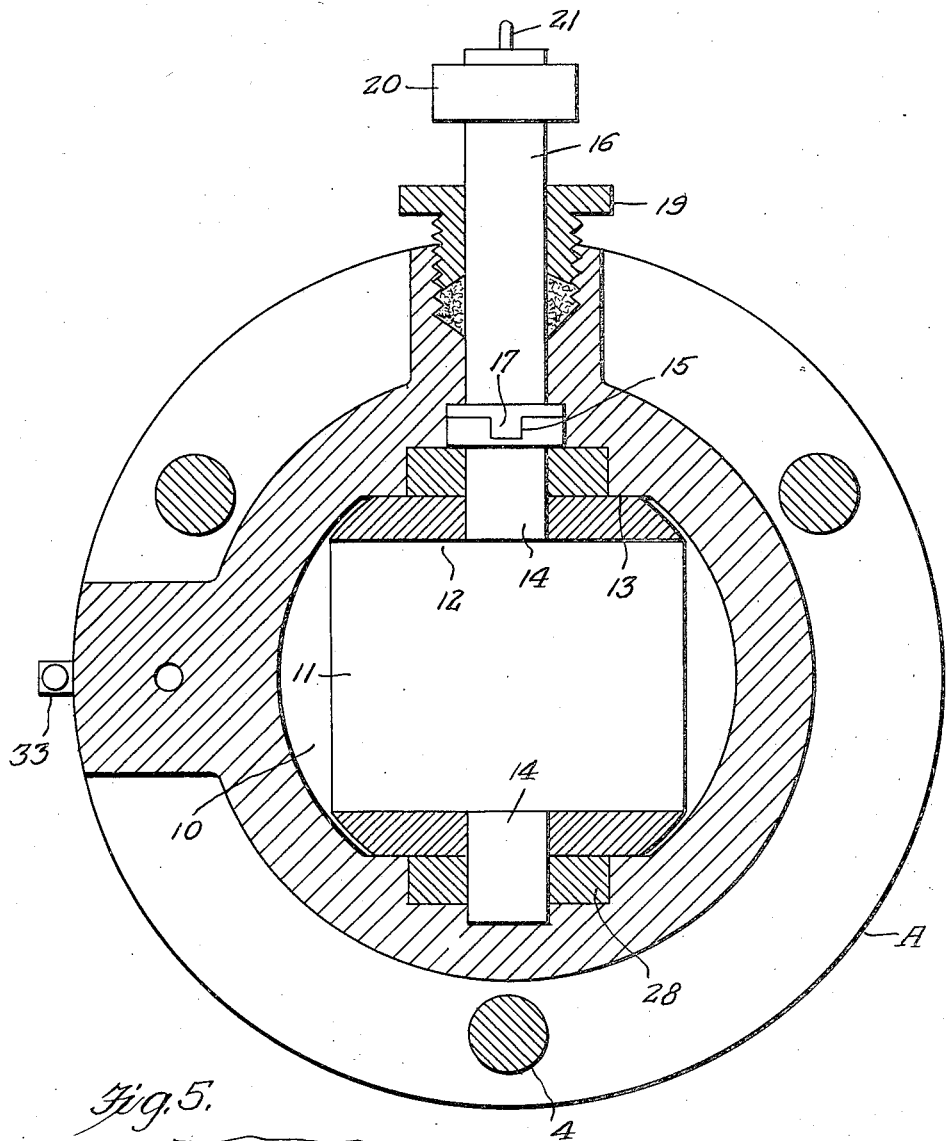
Fig. 3 is a section on approximately the line 3—3 of Fig. 1 but showing the trunnions and the valve stem in elevation.
Figure 5:
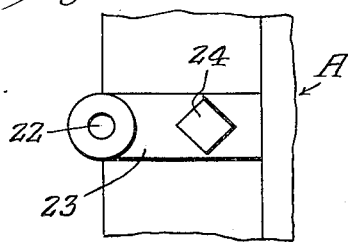
Fig. 5 is a view of the index plate and a portion of the casing to which the plate is attached.

In these drawings, the letter A indicates the valve casing which is composed of the central section 1 and the end sections 2 and 3, these sections being bolted together by the bolts 4. The section 3 is formed with an internally threaded part 5 for receiving the inlet pipe from the fluid pressure system and said section is formed with an inwardly extending cylindrical part 6 which is of substantially the same diameter as the inlet pipe. The section 2 is formed with an internally threaded part 7 for receiving the outlet pipe and the inner face of said section 2 is formed with a recess for receiving the valve seat 8 which surrounds the opening 9 which communicates with the outlet pipe. The casing forms a chamber 10 for the ball-shaped valve 11 which has an opening 12 therein of substantially the same diameter as the interior diameter of the cylinder 6 and the outlet opening 9 so that when the valve is in open position, this opening 12 will permit an unrestricted flow of the fluid through the device. The side parts of the valve opposite those side parts through which the opening 12 passes are flattened as shown at 13 and contact flat parts of the walls of the chamber 10 as shown in Fig. 3 and these flattened sides have the trunnions 14 attached thereto which engage bearing recesses in the walls of the chamber 10 as also shown in Fig. 3. One trunnion has a head at one end grooved as shown at 15 and the valve stem 16 has a rib 17 on its enlarged inner end which slidingly fits in the groove, the bearing openings or recesses for the trunnions 14 in the walls of the chamber 10 being elongated so that the valve 11 can have limited sliding movement towards and away from its seat. These bearing recesses are shown at 18. The stem 16 passes through a packing gland 19 and has a handle 20 connected to its outer end to turn the stem and the valve to open and close the valve and the handle carries a pin 21 for engaging the recesses 22 in the brackets or index plates 23 which are bolted to the casing as shown at 24. These plates are so arranged that when the pin 21 is in engagement with one of the plates, the valve will be in open position and when engaging either one of the other plates, the valve will be in closed position with one of its arcuate-shaped sides or the other engaging the valve seat.

Figure 1:
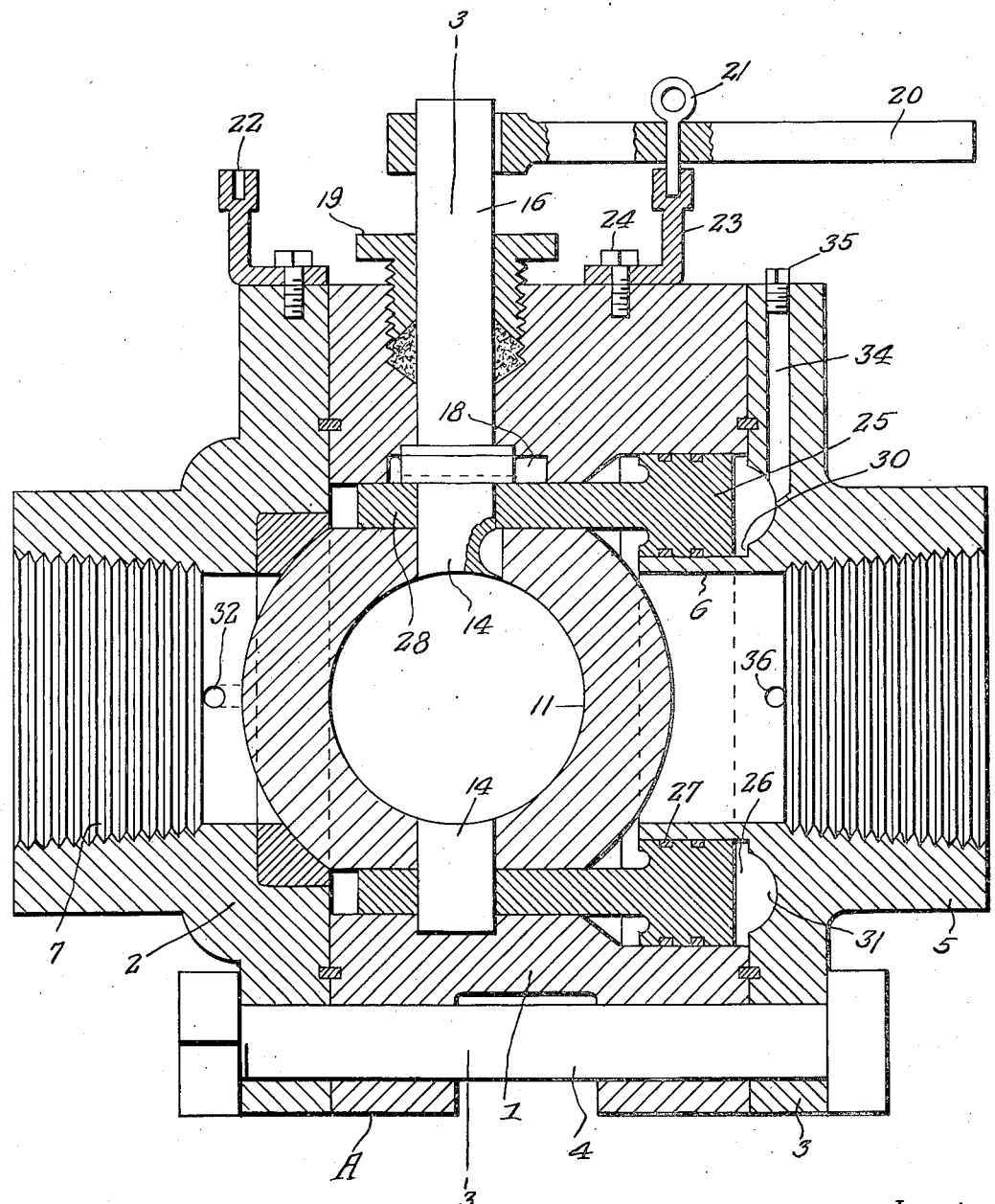
Fig. 1 is a longitudinal sectional view through the invention.

A ring-shaped piston 25 operates in an annular cylinder 26 formed by a circular wall of the chamber 10 and the cylindrical extension 6, this ring-shaped piston being provided with the usual rings 27 and it is provided with the oppositely located perforated ears 28, the perforations or holes 29 of which receive the trunnions 14 so that as the piston 25 is moved in one direction, the valve is bodily moved against the seat as shown in Fig. 1 and when moved in an opposite direction, the valve is moved slightly away from the seat. When the valve is moved away from the seat, the piston will be engaging the shoulders 30 formed in the annular shaped cylinder at the closed portion thereof, and this closed part of the annular cylinder is formed with a groove 31 with which communicates a by-pass 32 formed in the walls of the casing and extending from said groove to the discharge opening 9. This by-pass is controlled by a plug valve 33 manually operated and a second passage 34 extends from the groove 31 through an exterior part of the casing, this passage being closed by a plug 35 when the by-pass 32 and the plug-valve 33 are being used. A small equalizing port 36 connects the groove of the annular chamber with the interior of the outer end of the cylindrical extension 6, this port being smaller than the by-pass.

Figure 2:
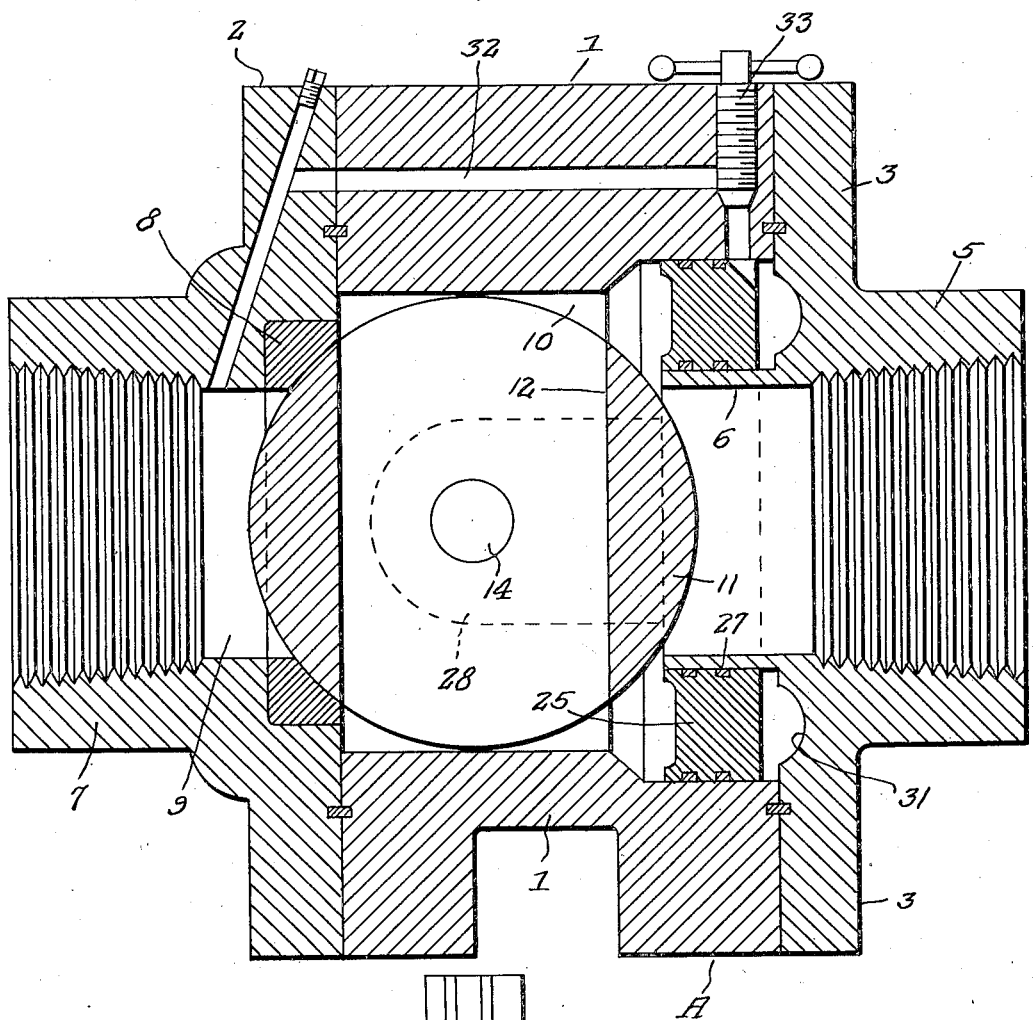
Fig. 2 is a similar view but taken at right angles to Fig. 1.
Figure 4:
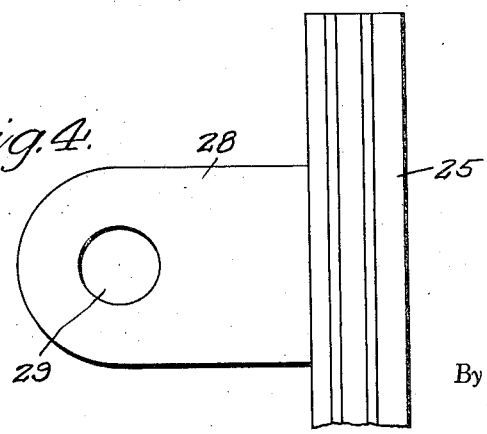
Fig. 4 is a view of the piston.

Fig. 1 shows the valve closed and as some of the fluid under pressure has entered the annular cylinder and its groove 31 through the equalizing port 36, the ring-shaped piston is acting to press the valve upon its seat and in this condition the valve 33 is closed as shown also in Fig. 2. Of course, some of the fluid under pressure is acting against the other side of the ring-shaped piston but the pressure on the two faces of the ring-shaped piston equalizes each other and thus the valve is closed and the pressure of the fluid acting against the valve acts to hold it closed in a fluid-tight manner.

When the valve is to be opened, the plug valve 33 is opened by hand so that the fluid in the closed part of the ring-shaped cylinder 26 and its groove 31 can flow out through the by-pass 32 into the discharge 9. As the by-pass is larger than the port 36, the fluid flows from the ring-shaped cylinder faster than it can enter, so that the pressure is reduced on the adjacent face of the piston while the full pressure is acting on the opposite face so that the piston moves to the right in Figs. 1 and 2 carrying the trunnions 14 and the valve 11 with it through means of the ears or lugs 28. Thus, the valve is moved away from the seat 8 and during this movement, the head of the trunnion 14 carrying the groove 15 moves into alinement with the stem 16 so that the stem when rotated will rotate the valve so that the valve will be opened with its passage 12 in alinement with the parts 6 and 9 to afford an unobstructed flow of the fluid through the valve. As the valve has been moved off its seat, it can be turned with but little effort and this turning movement will not damage either the seat or the valve as it would if the parts were in contact.

When the valve is to be closed, the handle 20 is turned which turns the valve and this turning movement can be made with little effort as the valve is still spaced from its seat due to the valve 33 being open. Then the valve 33 is closed which allows the pressure to build up in the groove 31 of the ring cylinder 26, as the fluid enters said part of the cylinder by way of the port 36 so that the pressure on both sides of the piston will be equalized and thus the pressure of the fluid entering the casing against the valve 11 will force it against its seat.

When the valve is to be operated from a distance, the valve 33 is closed, the plug 35 removed and a long pipe connected with the passage 34, said pipe containing a valve whereby said pipe can be opened and closed to control the pressure in the annular cylinder, the same as the valve 33 does. An extension is also connected to the stem 16 and the handle 20 connected to the outer end of said extension. This permits the valve to be operated from a remote point and is desirable where there is danger of fire since this arrangement permits the valve to be closed from a remote point where one will not be affected by the flames.

It is thought from the foregoing description that the advantages and novel features of the invention will be readily apparent.

It is to be understood that changes may be made in the construction and in the combination and arrangement of the several parts, provided that such changes fall within the scope of the appended claims.

We claim:

1. A valve for controlling the flow of fluid under pressure comprising a casing having an inlet and an outlet, a seat encircling the inner end of the outlet, a valve rotatably arranged in the casing and having a passage therethrough which when the valve is in one position will register with the inlet and outlet and when the valve is in another position will extend at right angles to the passage with its solid part engaging the seat, an annular cylinder formed in the inlet end of the casing and having its front part closed, a small equalizing port connecting said front part with the inlet, the rear part of the cylinder opening into the valve chamber, piston operating in the cylinder, said valve having trunnions, perforated members connected with the piston and the perforations of which receive the trunnions, the pressure of fluid entering the casing moving the valve against its seat when the pressure of fluid against both faces of the piston is equalized, means manually controlled for lessening the pressure on the closed or front part of the cylinder for relieving the pressure against the adjacent face of the piston, whereby the pressure against the opposite face will move the piston and thus the valve and space the valve from its seat, and manually operated means for moving the valve to open or closed position after said valve is spaced from its seat.

2. A valve for controlling flow of fluid under pressure comprising a casing having an inlet at its front end and an outlet at its rear end, a seat surrounding the inner end of the outlet, a valve for engaging the seat, an inwardly extending cylindrical wall in the front part of the casing and forming an inner extension of the inlet, said wall forming with a part of the front portion of the casing, an annular cylinder which has its rear portion opening out into the casing beyond the cylindrical wall with its front end closed, the front portion of the cylindrical wall having a port therein connecting the inlet with the closed end of the annular cylinder, a ring-shaped piston in the annular cylinder, means for connecting the piston with the valve for causing the valve to move with the piston, the casing have a passage therein connecting the closed end of the annular cylinder with the outlet, a valve for controlling the passage, said valve when open permitting fluid to pass from the closed end of the annular cylinder to the discharge to relieve pressure in front of the piston, whereby the pressure of fluid acting on the rear end of the piston will move said piston and the valve forwardly to space the valve from the seat, and means for turning the first mentioned valve to open and closed position while the same is off its seat.

FRANK M. STOUT.
WINTFORD P. CUNNINGHAM.